Patented Oct. 13, 1925.

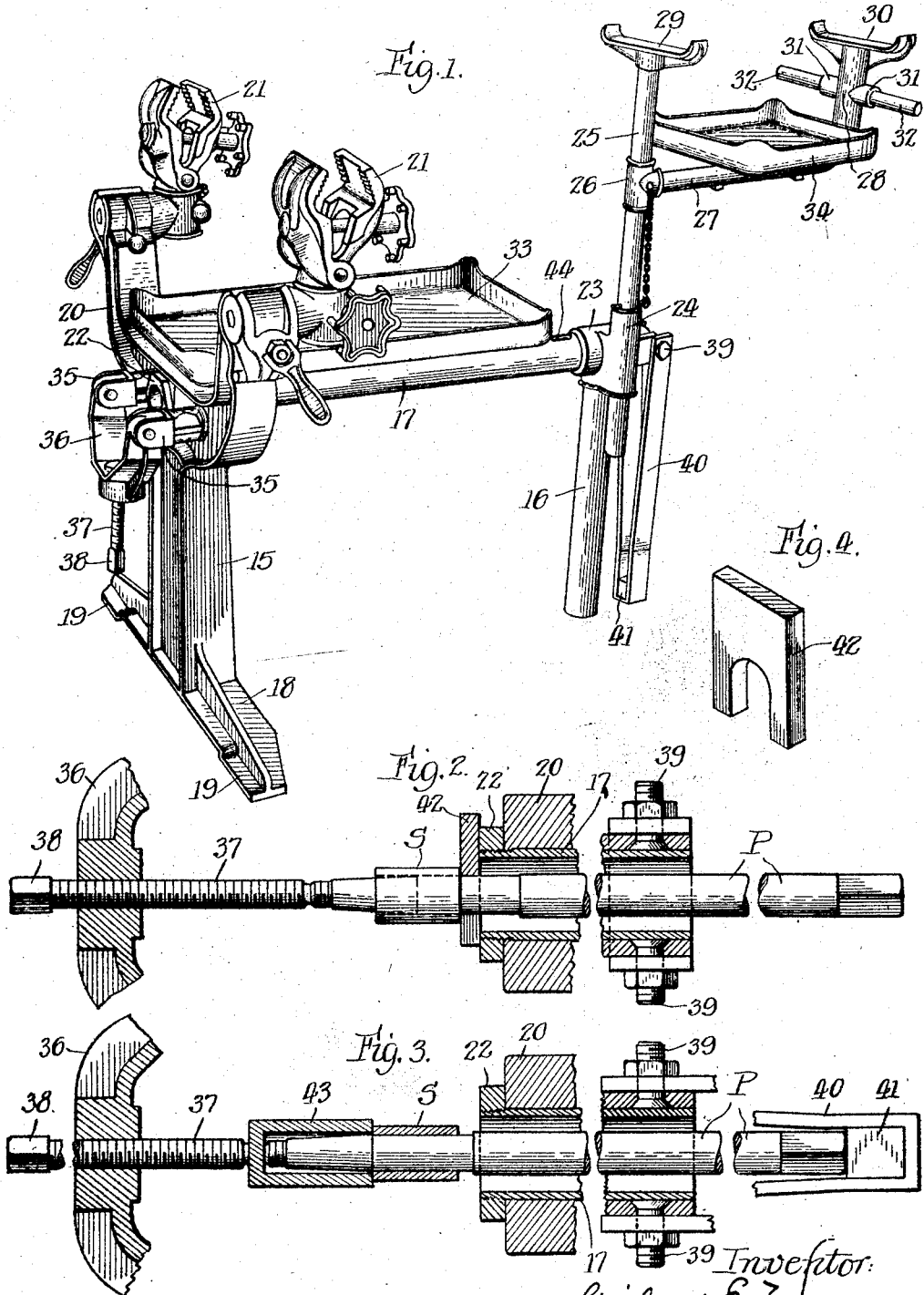

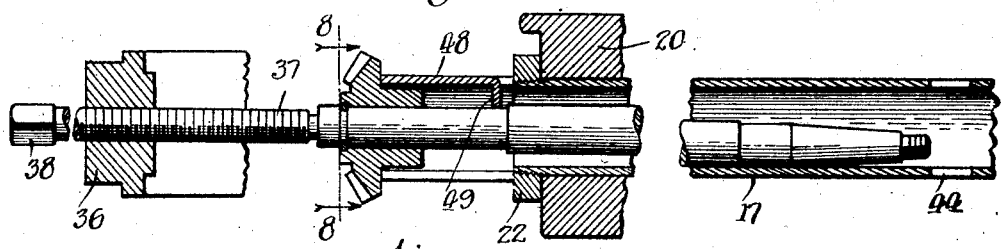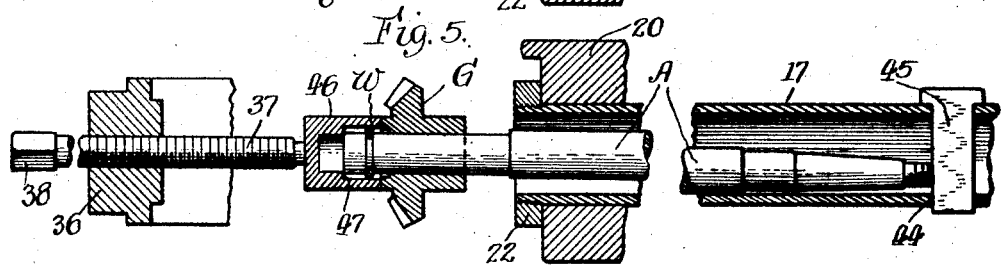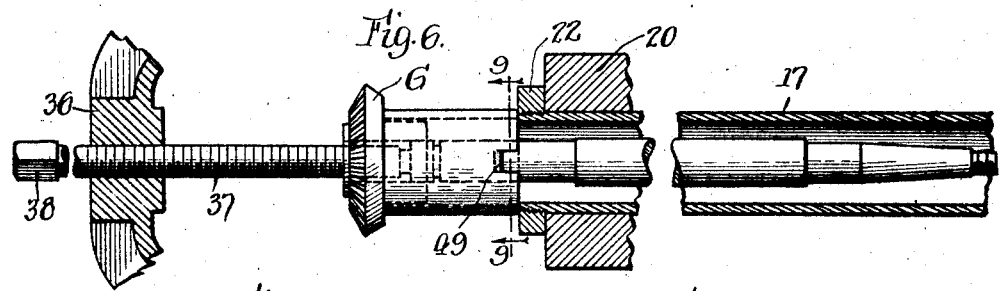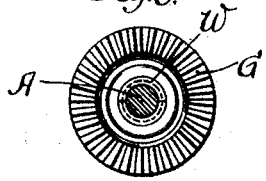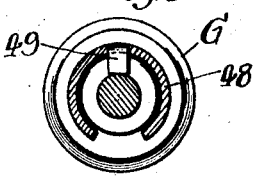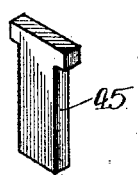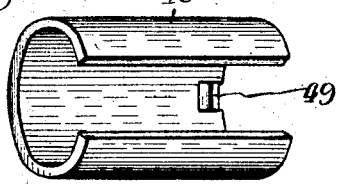

1,556,882

UNITED STATES PATENT OFFICE.

GAILARD E. WEAVER, OF SPRINGFIELD, ILLINOIS, ASSIGNOR TO WEAVER MANUFACTURING COMPANY, OF SPRINGFIELD, ILLINOIS, A CORPORATION OF ILLINOIS.

AXLE STAND.

Application filed May 16, 1925. Serial No. 30,684.

*To all whom it may concern:*

Be it known that I, GAILARD E. WEAVER, a citizen of the United States, residing at Springfield, in the county of Sangamon and State of Illinois, have invented certain new and useful Improvements in Axle Stands, of which the following is a specification.

This invention relates to improvements in a class of devices quite extensively used in garages and automobile repair shops for facilitating the making of repairs and renewals on the rear axle systems of automobiles, and known in the trade as axle stands. Devices of this character usually comprise an upright frame structure supporting and carrying the axle-engaging devices such as vises or clamps, racks for supporting the propeller shaft and radius rods, where the latter may be removed along with the rear axle assembly and differential, oil pans, tool trays, and various other accessories, the general purpose of the device being to provide the mechanic or workman with a handy and convenient combined work support and tool carrier.

The main purpose or object of my present invention is to provide in association with such an axle stand (either as a built-in structure or as an attachment) a simple and convenient means for performing certain operations upon the rear axle shaft or shaft sections and the propeller shaft, particularly such parts as found in Ford and Chevrolet cars and other cars having similarly designed rear axle and propeller shaft systems. The complete axle stand including my present improvements has been designed with the idea of servicing the rear system of the running gear in every required way without the necessity of taking any of the parts to other machines or equipment, and thus making it possible to service the entire rear system of the running gear in one machine. My present improvement is preferably built into and permanently incorporated with the axle stand as a part thereof, but may be adapted as an attachment for other axle stands already in use.

Other objects and attendant advantages of the invention will be apparent to persons skilled in the art to which it relates from the following detailed description, taken in connection with the accompanying drawings in which I have illustrated one practical and approved embodiment of the invention, and wherein—

Fig. 1 is a perspective elevation of an axle stand equipped with my present improvement;

Fig. 2 is a sectional detail, broken out, illustrating the manner and means of removing a hardened sleeve from one end of the propeller shaft which constitutes the inner race of a roller bearing operating adjacent to the drive pinion in the differential housing;

Fig. 3 is a view similar to Fig. 2 illustrating the manner and means of replacing a new sleeve on the propeller shaft;

Fig. 4 is a perspective elevation of a forked block employed in the removal process shown in Fig. 2;

Fig. 5 is a view similar to Figs. 2 and 3 illustrating the manner and means of performing the first step or operation in removing from a rear axle section the bevel gear that is driven by the differential;

Fig. 6 is a view similar to Fig. 5 illustrating the manner and means of performing the second step or operation in removing said gear from the rear axle section;

Fig. 7 is a view similar to Figs. 5 and 6 illustrating the manner and means of performing the operation of replacing on the axle section the removed gear or a new gear;

Fig. 8 is a cross-section on the line 8—8 of Fig. 7;

Fig. 9 is a cross-section on the line 9—9 of Fig. 6;

Fig. 10 is a perspective elevation of a removable stop or abutment key; and

Fig. 11 is a perspective elevation of an abutment sleeve employed in the operations illustrated in Figs. 6 and 7.

Referring to the drawings, and first briefly describing the structural features and equipment of the stand as heretofore built and used prior to the incorporation therein of my present improvements, the stand frame comprises front and rear legs 15 and 16 respectively and a top cross-bar 17 of tubular form. The front leg 15 is provided with a wide supporting base 18 extending laterally of the vertical plane of the stand and equipped at its ends with feet 19. On the upper end of the front leg 15 is an integral yoke 20 disposed transversely of the frame and equipped on the upper ends of its arms with a pair of clamps 21 constituting a vise in which the rear axle assembly can be securely supported and held. The transverse member 17 at one end is tightly fitted to a hole in the center of the yoke 20 and threaded at its forward end to receive a fastening nut 22. The other end of the member 17 and the rear leg 16 are united by a hollow T union 23, this latter being formed with a lateral vertical sleeve 24 to receive a rear standard 25. Swiveled on the standard 25 by a sleeve 26 is a rearwardly projecting horizontal arm 27 terminating in an upwardly turned free end on which is swiveled a short tubular standard 28. On the upper ends of the standards 25 and 28 are a pair of transversely disposed yokes 29 and 30 that form a convenient support for the rear end of the propeller shaft. The tubular standard 28 is formed with lateral hollow bosses 31 supporting arms 32 that constitute convenient supports for the radius rods.

Mounted on the transverse member 17 of the main frame is an oil pan 33 of ample dimensions to catch the oil drip from the parts supported by the stand, and on the arm 27 is mounted a tray 34 designed to hold tools and small parts of the assembly undergoing repair.

The stand as thus far described is complete for effecting most of the repair jobs required on the propeller shaft and rear axle assembly, but it is with a view to rendering the same more complete in its functional capacity and more especially adapting it to serve for the removal and replacement of gears, bearing sleeves, and the like that I have incorporated therein my present improvements which will now be described.

On the front face of the yoke 20 and on opposite sides of the forward end of the tubular cross member 17 are cast a pair of pivot lugs 35, in which are hinged the free ends of a yoke 36. Threaded through the center of the yoke is a screw 37 by which various pressing operations hereinafter described are effected. The screw 37 has on its outer end a squared head 38 to receive a wrench for turning the same. When the yoke 36 is swung upwardly to horizontal position, the axis of the screw 37 is substantially in line with the axis of the tubular cross member 17 of the frame.

On the rear end of the T-coupling 23 is hinged by a pair of pivot studs 39 free ends of the arms of a relatively long narrow yoke which may conveniently consist of strap iron, with a stop block 41 fitted into the narrow closed end of the yoke. In certain operations hereinafter described, the yoke 40 is raised to horizontal position wherein the block 41 constitutes a stop for the rear end of the propeller shaft.

Referring to Figs. 2, 3 and 4, P designates the long propeller or drive shaft, one end of which carries the differential drive pinion (not shown). In most makes of cars, this shaft is equipped just in rear of the drive pinion with a hardened steel sleeve S tightly fitting the same and forming the inner race of a roller bearing. When this sleeve through wear or breakage requires renewal, this is speedily effected in the manner and by the means illustrated in Figs. 2 and 3. The first necessary operation, of course, is to remove the worn or broken sleeve. This is done by passing the propeller shaft into the tubular frame member 17 until the sleeve S is slightly in advance of the forward end of the tube 17 and its fastening nut 22. A forked abutment block 42 straddling the shaft P is then inserted, as shown in Fig. 2, between the rear end of the sleeve S and the face of the nut 22 and front end of the tube 17. The yoke 36 is then swung upwardly to horizontal position and the screw 37 is advanced until its inner end abuts the end of the shaft P. The further advance of the screw manifestly forces the shaft P rearwardly and out of the sleeve S.

The re-equipment of the shaft with a sleeve is effected in the manner and by the means illustrated in Fig. 3. The shaft being in the tube 17, the rear yoke 40 is swung upwardly bringing the stop block 41 into line with the shaft, and the squared end of the latter which is the end that takes into the universal joint is abutted against the stop 41. The new sleeve having been entered over the opposite tapered end of the shaft as far as it can be forced by hand, a hollow thrust block or bushing 43 is then inserted between the forward end of the sleeve S and the inner end of the pressure screw 37, and by turning up the latter the sleeve is easily forced onto the shaft to its proper position, the hollow of the block 43 accommodating the tapered end of the propeller shaft during this operation.

In the rear axle system of the Ford and several other makes of cars, the bevel gear on each of the rear axle sections which is engaged and driven by the differential is locked against displacement from the inner end of the axle by a split washer fitted to an annular groove in the axle and projecting beyond the peripheral surface of the latter into a shallow countersink in the face of the gear hub. Manifestly, for the removal of this gear off the inner end of the axle it is necessary first to remove this washer, and this is done by the means and in the manner illustrated in Fig. 5, wherein A designates the axle section, G the bevel gear thereon, and W the split washer referred to. In the tubular frame member 17 just in advance of the T-coupling 23 is a transverse slot 44, to which is fitted a removable T-shaped stop block 45. The axle A having been entered into the tube 17 with its outer end abutting the stop block 45, a hollow thrust block or bushing 46, generally similar to the member 43 above-described, is inserted between the face of the gear G and the inner end of the screw 37; and by advancing the screw, the gear is pressed back until the split washer W is clear of the recess in the face of the gear, whereupon, by removing the thrust block 46 the two halves of the split washer can be readily withdrawn. This pressure or thrust block 46 is preferably formed with an internal annular shoulder 47 which will strike the end of the axle shaft when the gear has been sufficiently backed off from the washer. Of course, this same result may be accomplished by employing a shorter thrust block where the pressure screw 37 is of sufficient length.

The next operation is to press the axle shaft out of the gear. This is done in the manner and by the means illustrated in Figs. 6, 9, and 11. The stop 45 is removed, and a longitudinally slotted abutment sleeve 48 is entered between the rear face of the gear and the front face of the nut 22 and tube 17, the slot in the sleeve being wide enough to permit the sleeve to be entered sidewise over the shaft, and the rear end of the sleeve being preferably formed with an inwardly turned tongue 49 which rests on the top of the shaft and thereby centers the sleeve substantially coaxial with the shaft. The screw 37 is then engaged with the inner end of the axle shaft, and by advancing the screw as shown in Fig. 6, the shaft is easily pressed entirely through the hub of the gear.

The replacement of the same or a new gear is effected by substantially the same means and operations as those shown and described in connection with Figs. 5 and 6, the final operation being illustrated in Fig. 7. The new gear having been entered on the inner end of the shaft, it is pressed into the position shown in Fig. 5 through the use of the thrust block or bushing 46. The split washer W is then put in place, the stop 45 is removed, the abutment sleeve 48 is inserted between the gear and the frame, and the pressure screw 37 is moved into engagement with the inner end of the shaft and advanced until the shaft has been pressed endwise to a position wherein the split washer enters the face of the gear, all as shown in Fig. 7.

From the foregoing it will be apparent that my present improvements adapt the axle stand to the performance of gear and sleeve stripping and replacing operations, with the aid of the few simple abutment blocks and sleeves hereinabove described. These improvements render the stand adaptable for the complete servicing of Ford, Chevrolet and other rear axle systems, without making it necessary to transfer any of the parts to other machines or equipment. It will be observed that by hinging the yokes 36 and 40, they drop down out of the way when not in use and thus do not interfere with the free movements of the operator when performing other operations.

I have herein illustrated and described a simple and practical physical embodiment of the invention wherein the same is built into an axle stand of a known and used type and construction. It is manifest, however, that changes in the details of structure and arrangement may be resorted to without departing from the principle of the invention or sacrificing any of the advantages inhering therein; and also that the described improvements, instead of being built into the stand might be added as an attachment thereto. Hence, I do not limit the invention to the specific apparatus disclosed but reserve all such variations and modifications as fall within the spirit and purview of the appended claims.

I claim—

1. In a work stand of the character described, the combination with a frame including front and rear uprights and a tubular connecting member open at both ends, of a yoke hinged to one of said uprights, and a screw mounted in said yoke and adapted to be swung by the latter into and out of a position in axial alinement with said tubular member.

2. In a work stand of the character described, the combination with a frame including front and rear uprights and a horizontal tubular connecting member open at both ends, of yokes hinged to the outer sides of said uprights respectively and adapted to be swung into and out of the horizontal plane of said tubular member, and a thrust screw mounted in one of said yokes.

3. In a work stand of the character described, the combination with a frame including front and rear uprights and a transversely slotted tubular connecting member supported by and extending through the upper ends of said uprights and open at both ends, of a yoke hinged to the outer side of one of said uprights, a thrust screw mounted in said yoke and adapted to be swung by the latter into and out of a position in axial alinement with said tubular member, and an abutment block removably fitted to the slot of said tubular member.

4. In a work stand of the character described, the combination with a frame including front and rear standards and a horizontal transversely slotted tube supported by and connecting the upper ends of said standards and open at both ends, of thrust and abutment yokes hinged to the outer faces of said standards respectively and adapted to be swung into and beneath the horizontal plane of said tube, a screw mounted in said thrust yoke centrally and crosswise thereof, and an abutment block removably fitted to the slot of said tube.

5. In a work stand for servicing automobile running gears, mechanism for effecting the removal and replacement of axle gears, said mechanism including a frame structure formed with front and rear standards, and a transversely slotted tube supported by and connecting the upper ends of said standards and open at its front end, said tube adapted to receive an axle, a yoke hinged to said front standard, a thrust screw mounted in said yoke and adapted to be swung by the latter into and out of a position in axial alinement with said tube, an abutment block removably fitted to the slot of said tube, and a hollow thrust block adapted to be interposed between the inner end of said screw and the face of a gear on said axle whereby to press said gear inwardly along said axle.

6. In a work stand for servicing automobile running gears, mechanism for effecting the removal and replacement of axle gears, said mechanism comprising a frame structure formed with front and rear standards, and a transversely slotted tube supported by and connecting the upper ends of said standards and open at its front end, said tube adapted to receive an axle, a yoke hinged to said front standard, a thrust screw mounted in said yoke and adapted to be swung by the latter into and out of a position in axial alinement with said tube, an abutment block removably fitted to the slot of said tube, a hollow thrust block adapted to be interposed between the inner end of said screw and the face of a gear on said axle whereby to press said gear inwardly along said axle, and an abutment sleeve longitudinally slotted to pass over the axle and adapted to be interposed between the back of a gear on said axle and said front standard to hold said gear against movement as the axle is forced through the same by said screw.

7. In a work stand for servicing automobile running gears, mechanism for effecting the removal and replacement of bearing sleeves from propeller shafts, said mechanism including a frame structure formed with front and rear standards and a horizontal tube supported by and connecting the upper ends of said standards and open at both ends, said tube adapted to receive a propeller shaft, pressure and abutment yokes hinged to the outer sides of said uprights respectively and adapted to be swung into and out of the horizontal plane of said tube, a thrust screw mounted in said pressure yoke, and a slotted abutment block adapted to straddle the propeller shaft between the bearing sleeve on the latter and said front standard to hold said sleeve against movement as the propeller shaft is forced through the same by said screw.

8. In a work stand for servicing automobile running gears, mechanism for effecting the removal and replacement of bearing sleeves from propeller shafts, said mechanism comprising a frame structure formed with front and rear standards and a horizontal tube supported by and connecting the upper ends of said standards and open at both ends, said tube adapted to receive a propeller shaft, pressure and abutment yokes hinged to the outer sides of said uprights respectively and adapted to be swung into and out of the horizontal plane of said tube, a thrust screw mounted in said pressure yoke, a slotted abutment block adapted to straddle the propeller shaft between the bearing sleeve on the latter and said front standard to hold said sleeve against movement as the propeller shaft is forced through the same by said screw, and a hollow thrust block adapted to be interposed between the inner end of said screw and the outer end of said bearing sleeve whereby to press the latter onto said propeller shaft.

9. In a work stand of the character described, the combination with a frame including front and rear uprights and a connecting member open at both ends, of a yoke hinged to one of said uprights, and forcing means mounted in said yoke and adapted to be swung by the latter into and out of a position in axial alinement with said connecting member.

In witness whereof I have hereunto set my hand and seal.

GAILARD E. WEAVER. [L. S.]